US011094019B2

(12) United States Patent
Jolliffe et al.

(10) Patent No.: US 11,094,019 B2
(45) Date of Patent: Aug. 17, 2021

(54) ASSOCIATING OFF-LINE TRANSACTIONS WITH ON-LINE VISITOR WEB SESSIONS

(71) Applicant: School Outfitters, Cincinnati, OH (US)

(72) Inventors: Scott Jolliffe, West Chester, OH (US); David Lewis, Cincinnati, OH (US)

(73) Assignee: School Outfitters, Cincinnati, OH (US)

( * ) Notice: Subject to any disclaimer, the term of this patent is extended or adjusted under 35 U.S.C. 154(b) by 1120 days.

(21) Appl. No.: 13/898,662

(22) Filed: May 21, 2013

(65) Prior Publication Data

US 2014/0351102 A1      Nov. 27, 2014

(51) Int. Cl.
  *G06Q 40/00*      (2012.01)
  *G06Q 30/02*      (2012.01)
(52) U.S. Cl.
  CPC ......... *G06Q 40/12* (2013.12); *G06Q 30/0241* (2013.01); *G06Q 30/0242* (2013.01); *G06Q 40/10* (2013.01)
(58) Field of Classification Search
  CPC .... G06Q 40/10; G06Q 40/12; G06Q 30/0241; G06Q 30/0242
  USPC ....................... 705/30, 14.4, 14.41
  See application file for complete search history.

(56) References Cited

U.S. PATENT DOCUMENTS

| 8,756,168 B1 * | 6/2014 | Jayaram | G06Q 30/0282 |
| | | | 705/1.1 |
| 2003/0033211 A1 * | 2/2003 | Haines | B01J 23/6562 |
| | | | 705/14.1 |
| 2006/0047563 A1 * | 3/2006 | Wardell | G06Q 30/02 |
| | | | 705/14.67 |
| 2008/0275744 A1 * | 11/2008 | MacIntyre | G06F 17/30536 |
| | | | 705/7.11 |
| 2010/0228627 A1 * | 9/2010 | Hong | G06Q 30/0253 |
| | | | 705/14.51 |
| 2011/0112897 A1 * | 5/2011 | Tietzen | G06Q 30/02 |
| | | | 705/14.25 |
| 2011/0231223 A1 * | 9/2011 | Winters | G06Q 20/10 |
| | | | 705/7.29 |

* cited by examiner

*Primary Examiner* — Florian M Zeender
*Assistant Examiner* — Christopher R Buchanan
(74) *Attorney, Agent, or Firm* — Wood Herron & Evans LLP

(57) ABSTRACT

Methods, system, and computer program products for associating off-line transactions involving a product with visitors to a web-site. Data relating to an off-line transaction and data relating to visitors to a web-site is received in a computer. The computer determines a score for each visitor based on a number of page views relating to a product in the transaction. A subset of visitors may be determined based on the scores. A likely candidate may then be selected from the subset of visitors using matching methods that compare e-mail addresses, IP addresses, geographic proximities, and times of event occurrences of the transaction to those of the visitor web sessions. The visitor having the strongest match may be identified as a likely candidate, and a web session generated by the likely candidate associated with the off-line transaction for analytics analysis of web marketing and web-site design effectiveness.

21 Claims, 12 Drawing Sheets

Home > Tables > Folding Tables > High-Pressure Top Folding Table

Norwood Commercial Furniture
High-Pressure Top Folding Table

  Ships Today    $ On Sale $114.99 – $154.99

Click a link in the product list to learn more. Please call 1-800-260-2776 to order by phone.

| | Price | Tabletop Dimensions | |
|---|---|---|---|
| View Details | $114.99 | 30" W x 60" L | ~156a |
| View Details | $124.99 | 30" W x 72" L | ~156b |
| View Details | $139.99 | 36" W x 72" L | ~156c |
| View Details | $144.99 | 30" W x 96" L | ~156d |
| View Details | $154.99 | 36" W x 96" L | ~156e |

Norwood Commercial Furniture's High-Pressure Top Folding Table has a durable particleboard core with a high-pressure laminate surface. The heavy-gauge steel construction and roll-formed steel apron strengthen the frame and ensure long-lasting durability. The powder coat finish protects the frame against scratches, and the vinyl bullnose edging keeps the table sides from chipping. Non-marring polypropylene feet keep your floor safe, and folding legs make storage and transport simple. Choose from several sizes.

Click a link below to order your Norwood training table online or call our friendly sales staff at 1-800-260-2776 if you have questions or prefer to order by phone.

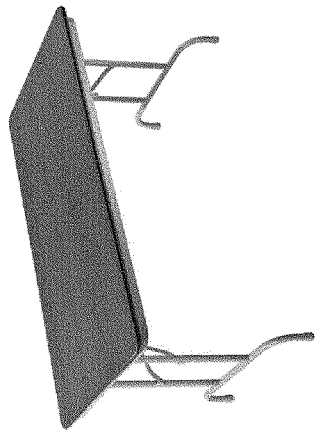

Click to Enlarge

High-Pressure Top Folding Table

Roll over any image for a larger view.
Click to select photos.

| Quote No | Quote Transaction ID | Max Score | Visitor Type | Visitor ID | Visitor Match Indicator | View Score | Visitor Transaction ID | Candidate Match Method | ZIP Code Match | State Match |
|---|---|---|---|---|---|---|---|---|---|---|
| QUO1400581 | UNAVAILABLE | 2 | Guest | 21858834 | LIKELY | 2 | 11301188442065 | Proximity | Ship To - 5 digits | Ship To - CONNECTICUT |
| | | | Guest | 21853543 | POSSIBLY | 2 | 11301188043324 | Proximity | NO | NO |
| | | | Guest | 21852483 | POSSIBLY | 2 | 11301188780271 | Proximity | NO | NO |
| | | | Guest | 21827079 | POSSIBLY | 2 | 11301188143271 | Proximity | NO | NO |
| | | | Guest | 21771805 | POSSIBLY | 2 | 11301117A050465 | Proximity | NO | NO |
| | | | Guest | 21807601 | POSSIBLY | 2 | 11301117A610601 | Proximity | NO | NO |
| | | | Guest | 21801371 | POSSIBLY | 2 | 11301178825700 | Proximity | NO | NO |
| | | | Guest | 21796620 | POSSIBLY | 2 | 11301178728687 | Proximity | NO | NO |
| | | | Guest | 21796716 | POSSIBLY | 2 | 11301117A323454 | Proximity | NO | NO |
| | | | Guest | 21794310 | POSSIBLY | 2 | 11301178061282 | Proximity | NO | NO |

FIG. 10

| Quote No | Quote Transaction ID | Max Score | Visitor Type | Visitor ID | Visitor Match Indicator | View Score | Visitor Transaction ID | Candidate Match Method | ZIP Code Match | State Match |
|---|---|---|---|---|---|---|---|---|---|---|
| QUO1400685 | UNAVAILABLE | 8 | Customer | 154896 | LIKELY | 8 | 11301198383275 | EmailAddress | | |
| | | | Guest | 78446520 | POSSIBLY | 8 | 11301116A415716 | Proximity | NO | NO |
| | | | Guest | 21807812 | POSSIBLY | 4 | 11301117A536305 | Proximity | NO | NO |
| | | | Guest | 21813254 | NO | 3 | 11301178221448 | Proximity | NO | NO |
| | | | | | | | 11301116B420720 | | | |
| | | | Guest | 21460594 | NO | 3 | 11301168217278 | Proximity | NO | NO |
| | | | Guest | 21234994 | NO | 3 | 11301115A510603 | Proximity | NO | NO |
| | | | Guest | 21824510 | NO | 2 | 11301188520538 | Proximity | Ship To - 2 digits | Ship To - TENNESSEE |
| | | | Guest | 21773902 | NO | 2 | 11301117A476541 | Proximity | Ship To - 2 digits | Ship To - TENNESSEE |

FIG. 11 — Table 222

| Quote No (230) | Quote Transaction ID (238) | Max Score (246) | Visitor Type (254) | Visitor ID (262) | Visitor Match Indicator (270) | View Score (278) | Visitor Transaction ID (286) | Candidate Match Method (294) | ZIP Code Match (302) | State Match (310) |
|---|---|---|---|---|---|---|---|---|---|---|
| QUO1400152 | UNAVAILABLE | 6 | Guest | 21719218 | LIKELY | 6 | 11301116A332648 | Similar IP Address - 3 Octets | | |
| | | | Guest | 21789290 | NO | 2 | 11301117A076343 | Proximity | Ship To - 1 digits | NO |
| | | | Guest | 21761568 | NO | 2 | 11301117B943207 | Proximity | Ship To - 1 digits | NO |
| | | | Guest | 21690043 | NO | 2 | 11301117A310015 | Proximity | Ship To - 1 digits | NO |
| | | | Guest | 21644712 | NO | 2 | 11301115A245132 | Proximity | Ship To - 1 digits | NO |
| | | | Guest | 21575958 | NO | 2 | 11301115B163408 | Proximity | Ship To - 1 digits | NO |
| | | | Guest | 21532735 | NO | 2 | 11301114B815448 | Proximity | Ship To - 1 digits | NO |
| | | | Guest | 21529712 | NO | 2 | 11301113B528828 | Proximity | Ship To - 1 digits | NO |
| | | | | | | | 11301113A538212 | | | |

FIG. 12 — Table 223

| Quote No (231) | Quote Transaction ID (239) | Max Score (247) | Visitor Type (255) | Visitor ID (263) | Visitor Match Indicator (271) | View Score (279) | Visitor Transaction ID (287) | Candidate Match Method (295) | ZIP Code Match (303) | State Match (311) |
|---|---|---|---|---|---|---|---|---|---|---|
| QUO1400066 | UNAVAILABLE | 2 | Guest | 21724297 | LIKELY | 2 | 11301116A477837 | Proximity | Ship To - 1 digits | Ship To - VIRGINIA |
| | | | Guest | 21607547 | POSSIBLY | 1 | 11301114A265232 | Proximity | Ship To - 1 digits | Ship To - VIRGINIA |
| | | | Guest | 21500777 | POSSIBLY | 2 | 11301112A324510 | Proximity | Ship To - 1 digits | Ship To - VIRGINIA |
| | | | Guest | 7714206 | POSSIBLY | 1 | 11301111A108603 | Proximity | Ship To - 1 digits | Ship To - VIRGINIA |
| | | | | | | | 11301117B564428 | | | |
| | | | Guest | 21785750 | POSSIBLY | 1 | 11301117B366517 | Proximity | Ship To - 1 digits | NO |
| | | | Guest | 21711519 | POSSIBLY | 1 | 11301116B587725 | Proximity | Ship To - 1 digits | NO |
| | | | | | | | 11301117B344468 | | | |

ASSOCIATING OFF-LINE TRANSACTIONS WITH ON-LINE VISITOR WEB SESSIONS

TECHNICAL FIELD

The present invention relates generally to transactions involving goods and services that are related to Internet commerce, and more specifically, to associating on-line activities of a web-site visitor with off-line transactions.

BACKGROUND

The Internet is a publically accessible global network of interconnected computers. A computer connected to the Internet can send and receive data from other computers that are also connected to the Internet, thereby allowing the computers to exchange information and provide services to each other. Web browsing in particular is widely used as a way to access information and services available through the Internet, and has become a common way to shop for goods and services. To take advantage of this trend, many merchants have web-sites that allow Internet users to research and purchase goods and services on-line. On-line purchasing typically involves the user browsing a collection of products displayed on a series of web pages (i.e., shopping) to find products in which they are interested. When the user finds a product they wish to purchase, the user may purchase the product on-line by selecting the product and a method of payment. The product may then be shipped to or downloaded by the user.

In order to attract users to their web-sites, on-line merchants may implement various web-marketing tools, such as buying advertisements that are displayed on other web-sites, or paying search engine providers to have certain key-word searches return links to their web-site. Users clicking on an advertisement or a link returned by a search engine may be directed to the merchant's web-site. Web-based marketing may thereby increase customer traffic and on-line sales for the merchant. A merchant may also try to improve sales by organizing its web-site so that users are directed to products they are likely to buy or to otherwise improve the customer experience. To determine the effectiveness of a particular form of web-based marketing or a particular web-site configuration, merchants typically track how users navigate to their web-site and how users behave while shopping at the web-site. For example, a user that performs a search for the word "chairs" on a search engine may be presented with a link to an on-line merchant that sells chairs. If the user follows the link, the merchant will be able to determine that the user was directed to the web-site by the search engine based on the keyword search for "chair". The merchant may thereby associate on-line sales to the web-based marketing tool that brought the customer to the site, or to a particular web-site design change or web-site feature. Based on the relative success and cost of a particular marketing tool or web-site feature, the merchant can then determine how to modify their web-site or direct their marketing budget to optimize their return on investment.

Because of the convenience and reduced costs associated with Internet shopping, sales of products over the Internet have seen tremendous growth. In response to this demand, many traditional brick-and-mortar and catalog merchants sell products on-line as well as through traditional methods, such as in stores and by taking orders over the phone. Sales, quotes or purchase orders occurring through these traditional methods are referred to as "off-line transactions" to differentiate them from sales made on-line. For merchants having an on-line and an off-line presence, users may use the merchant's web-site to shop for products of interest on-line, then either visit the brick-and-mortar store to purchase the product, or place an order for the product over the phone. Thus, purchases made off-line may nevertheless be generated by on-line marketing. However, because off-line transactions bypass the web-site, current methods and systems for tracking the effectiveness of on-line marketing fail to adequately take into account off-line transactions generated by on-line marketing. Because off-line transactions may make up a large proportion of total sales for certain products or merchants, the inability to track the effects of on-line marketing on off-line transactions may result in less effective marketing strategies. This may be especially true for merchants of high-value products, or products that customers typically prefer to handle before making a purchase decision. However, known analytics methods are unable to accurately associate this off-line business to the web session that generated the transaction, and thus fail to adequately take into account off-line transactions in determining the effectiveness of on-line marketing.

Therefore, improved methods and systems for tracking off-line transactions, and associating these off-line transactions with web-based marketing, are needed to improve the management of web-based marketing tools, provide improved knowledge regarding the behavior of web-site visitors, and increase understanding of the how web-site design and promotion affects both on-line and off-line transactions.

BRIEF SUMMARY

In an embodiment of the invention, a method is provided for associating a transaction involving one or more products with a visitor to a web-site. The method includes receiving first and second data at a computer. The first data may relate to the transaction, and the second data may relate to a plurality of web sessions, each web session having been generated by a visitor to the web-site. The method further includes determining, for each visitor and based on the first and second data, if any products in the transaction relate to a page viewed by the visitor during the visitor's web session. The method further generates a visitor score based on the number of products in the transaction that were determined to relate to a viewed web page, and associates one or more of the visitors with the transaction based on the visitor score.

In another embodiment of the invention, a method is provided for associating a transaction involving one or more products with a visitor to a web-site. The method includes receiving first and second data at the computer, the first data relating to the transaction and the second data relating to a plurality of web sessions, each web session having been generated by a visitor to the web-site. The method further includes defining, based on the first and second data, a first plurality of visitors that generated a web session including a view of a web page associated with at least one product in the transaction. A first parameter is determined based on the first data, a second parameter is determined based on the second data, and a second plurality of visitors is defined from the first plurality of visitors based on the first parameter matching the second parameter. A likely candidate is then selected from the second plurality of visitors based on the strength of the match between the first and second parameters, and associated with the transaction.

In another embodiment of the invention, an apparatus for associating a transaction involving a product with a visitor to a web-site is provided. The apparatus includes a processor and memory including program code that, when executed by the processor, causes the apparatus to receive first and second data at the processor, the first data relating to the transaction and the second data relating to a plurality of web sessions, each web session having been generated by a visitor to the web-site. The code further causes the processor to determine, for each visitor and based on the first and second data, if any products in the transaction relate to a page viewed by the visitor during the visitor's web session. The code further causes the processor to generate a visitor score based on the number of products in the transaction that were determined to relate to a viewed web page, and associate one or more of the visitors with the transaction based on the visitor score.

In another embodiment of the invention, a computer program product is provided. The computer program product includes a computer readable storage media containing program code that, when executed by a computer, causes the computer to receive first and second data, the first data relating to the transaction and the second data relating to a plurality of web sessions, each web session having been generated by a visitor to the web-site. The code further causes the computer to determine, for each visitor and based on the first and second data, if any products in the transaction relate to a page viewed by the visitor during the visitor's web session. The code further causes the computer to generate a visitor score based on the number of products in the transaction that were determined to relate to a viewed web page, and associate one or more of the visitors with the transaction based on the visitor score.

BRIEF DESCRIPTION OF THE SEVERAL VIEWS OF THE DRAWINGS

The accompanying drawings, which are incorporated in and constitute a part of this specification, illustrate various embodiments of the invention and, together with the general description of the embodiments of the invention given above and the detailed description of the embodiments given below, serve to explain the embodiments of the invention.

FIG. 7B is a view of a product family page displayed in response to selecting a link on the product sub-category page of FIG. 7A.

FIG. 9 is a diagrammatic view of an exemplary result sheet that may be generated by the data connection module of FIG. 3.

FIG. 10 is a diagrammatic view of another exemplary result sheet that may be generated by the data connection module of FIG. 3.

FIG. 11 is a diagrammatic view of yet another exemplary result sheet that may be generated by the data connection module of FIG. 3.

FIG. 12 is a diagrammatic view of yet another exemplary result sheet that may be generated by the data connection module of FIG. 3.

DETAILED DESCRIPTION

Embodiments of the invention are generally directed to methods, systems, and computer program products for establishing connections between on-line visitors to a web-site and subsequent off-line transactions, such as requesting a quote or placing an order for a product. In particular, during on-line sessions by a visitor to a web-site, data relating to the site visitor and the web session is collected. The data collected may include, but is not limited to Internet Protocol (IP) address information relating to a computer the visitor is using, a geographic location of the visitor based on the IP address or as determined by a user device (e.g., a GPS location provided by a smart phone), web-site navigation patterns and viewed pages, e-mail addresses or other information entered by the visitor, and paths by which the visitor arrived at the web-site (e.g., by following a link returned by a search engine, or clicking on an advertisement on another web-site). Some of this data may be collected after the web-session has concluded. For example, the geographic location may be determined by looking up an IP address or top-level domain on a WHOIS service at a later time.

The collected data may then be compared to data relating to an off-line transaction. The off-line transaction data may include the type of product as well as customer specific information, such as a shipping address or e-mail address of one or more contacts associated with the transaction. Web-site visitor scores may be determined based on the on-line and off-line data, and a visitor having a sufficiently high score may be associated with the particular off-line transaction. For example, all visitors that have viewed a product within a predefined period of time may be identified as candidates for the off-line transaction. One visitor from within this group of candidates may then be identified as the likely visitor based on additional data, such as an e-mail address, IP address, geographic location, and/or a proximity in time between the visitor's web session and the off-line transaction. A visitor transaction ID for the likely candidate's web session may then be associated with the off-line transaction. The off-line transaction may thereby be associated with the likely candidate's on-line session. In this way, on-line marketing effectiveness can be determined based on both on-line and off-line transactions generated by the on-line marketing activity. Web-based marketing decisions may then be evaluated based on total sales generated rather than just on-line sales.

Figure 1:
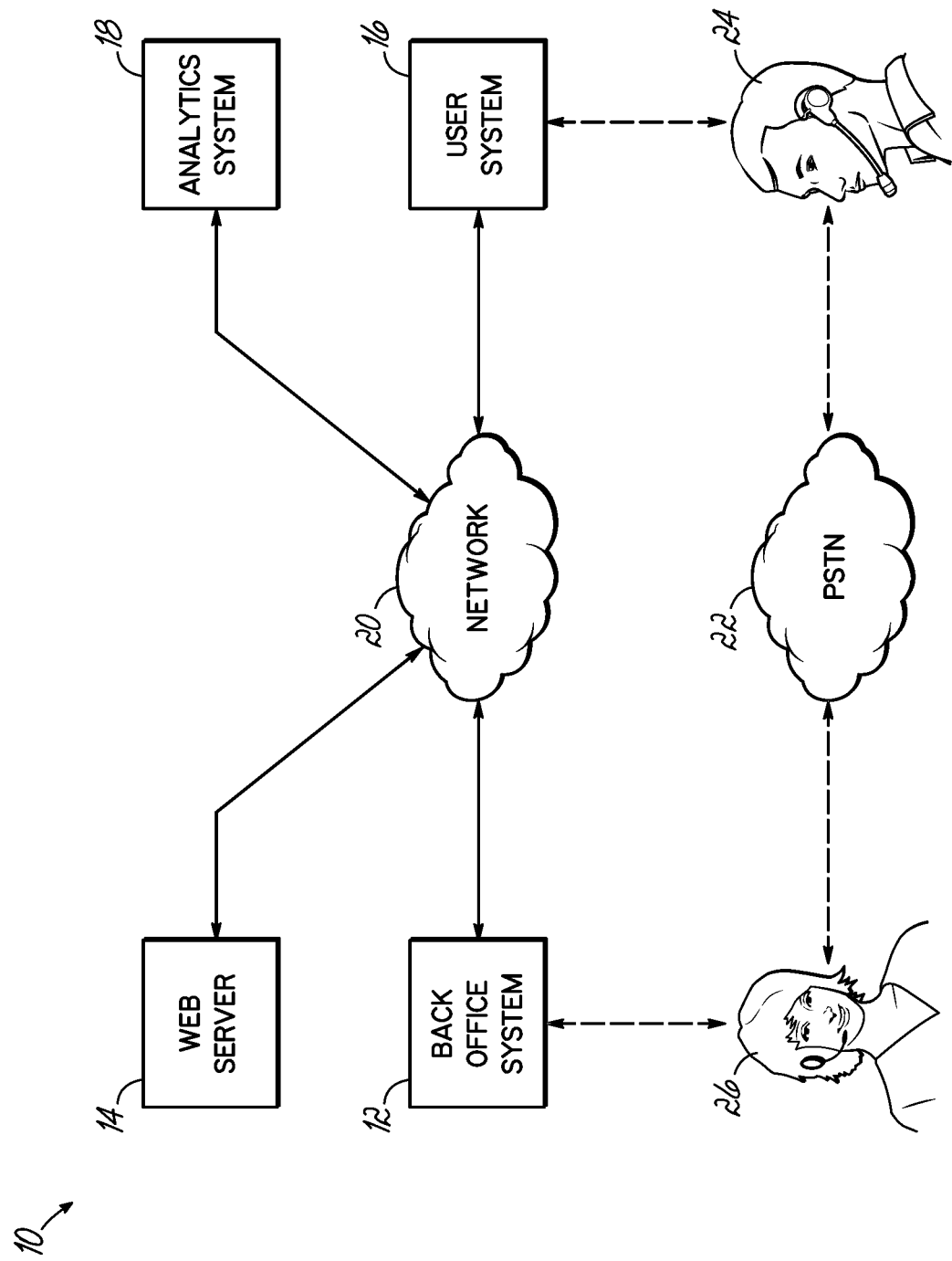
FIG. 1 is a schematic view of an operating environment in accordance with embodiments of the invention.

Referring now to FIG. 1, an operating environment 10 in accordance with an embodiment of the invention may include a back-office system 12, a web server 14, a user system 16, and an analytics system 18 that are in communication via a network 20. The network 20 may include one or more private and/or public networks (e.g., the Internet) that enable the exchange of data. The operating environment 10 may also include a Public Switched Telephone Network (PSTN) 22 or other suitable communication network that allows a customer 24 to contact a sales associate 26 and execute off-line transactions.

The back-office system 12 may be configured to perform back-office tasks such as accounting functions, processing of company information, maintaining records of the merchant's sales and purchase transactions, order entry by sales associates, and updating inventory. The back-office system 12 may also produce invoices, receipts, and sales reports. The web server 14 may host a web-site that delivers web pages and other content to the user system 16 in response to requests received via the network 20. These requests may use a suitable protocol, such as the Hypertext Transfer Protocol (HTTP), and may be transmitted from the user system 16 by a client application, such as web browser. The web server 14 may also be configured to receive data from the user system 16, such as data entered by the customer 24, submitted web forms, and/or uploaded files. The analytics system 18 may be configured to receive data from the back-office system 12 and web server 14 regarding web-site visitor behavior and merchant sales. The analytics system 18 may include software programs and/or modules that measure the performance of the merchant's website in a commercial context. Performance metrics from the measurements may include, for example, determining the degree to which different web pages and/or key-word searches produce web-site traffic and/or result in on-line purchases. To gauge the effectiveness of web marketing campaigns and web-site design features, the data provided to the analytics system may also be compared against key performance indicators to determine customer responses to a web-site design feature or a marketing campaign.

Figure 2:
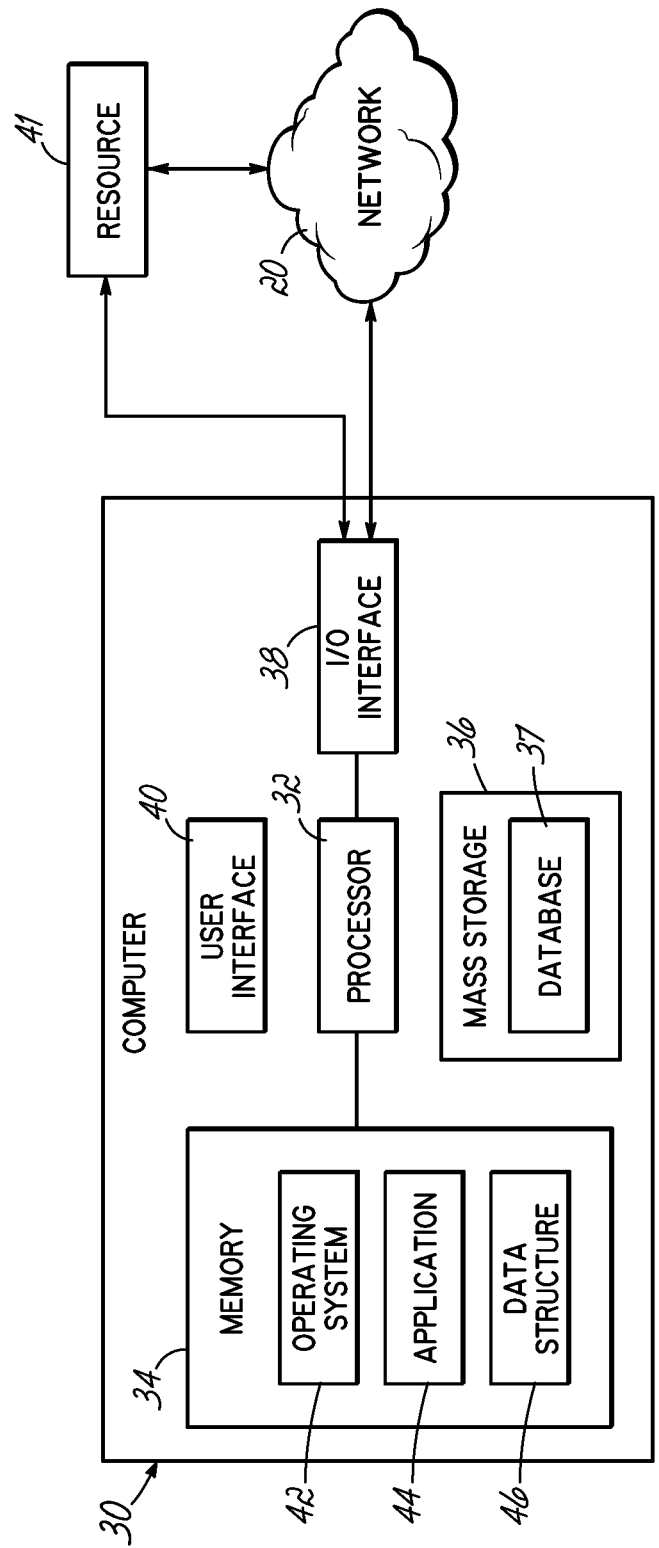
FIG. 2 is a schematic view of a computer suitable for use with the operating environment of FIG. 1.

Referring now to FIG. 2, the web server 14 and other systems 12, 16, 18 of operating environment 10 may be implemented on one or more computing devices or systems, such as exemplary computer 30. The computer 30 may include a processor 32, a memory 34, a mass storage memory device 36, an input/output (I/O) interface 38, and a user interface 40. The computer 30 may also be operatively coupled to one or more external resources 41 via the network 20 and/or I/O interface 38.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The computer 30 may also include a mass storage memory device 36, such as a hard drive, optical drive, tape drive, non-volatile solid state device, or any other device capable of storing information. A database 37 may reside on the mass storage memory device 36, and may be used to collect and organize data used by the various systems and modules described herein.

Processor 32 may operate under the control of an operating system 42 that resides in memory 34. The operating system 42 may manage computer resources so that computer program code embodied as one or more computer software applications, such as application 44 residing in memory 34 may have instructions executed by the processor 32. In an alternative embodiment, the processor 32 may execute the applications 44 directly, in which case the operating system 42 may be omitted. One or more data structures 46 may also reside in memory 34, and may be used by the processor 32, operating system 42, and/or controller application 44 to store or manipulate data.

The I/O interface 38 may provide a machine interface that operatively couples the processor 32 to other devices and systems, such as the network 20, and/or external resource 41. The application 44 may thereby work cooperatively with the network 20 and/or external resource 41 by communicating via the I/O interface 38 to provide the various features, functions, and/or modules comprising embodiments of the invention. The application 44 may also have program code that is executed by one or more external resources 41, or otherwise rely on functions and/or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 41, or provided by computing resources (hardware and software) that are provided as a service over the network 20, such as a cloud computing service.

The user interface 40 may be operatively coupled to the processor 32 of computer 30 in a known manner to allow a user to interact directly with the computer 30. The user interface 40 may include video and/or alphanumeric displays, a touch screen, a speaker, and any other suitable audio and visual indicators capable of providing information to the user. The user interface 40 may also include input devices and controls such as an alphanumeric keyboard, a pointing device, keypads, pushbuttons, control knobs, microphones, etc., capable of accepting commands or input from the user and transmitting the entered input to the processor 32.

In response to the customer 24 visiting the web-site, the web server 14 may generate a visitor transaction ID that uniquely identifies the resulting web session. The visitor transaction ID may then be associated with a subsequent off-line transaction so that the analytics system 18 can associate the web session with the transaction. In the case of an on-line transaction that occurs during the web session, the web session ID may be associated with the transaction by the web server 14 at the time of the transaction. However, associating an off-line transaction to an earlier web session can be challenging due to the lack of a connection in the web server 14 between the original web session and the resulting off-line transaction.

Figure 3:
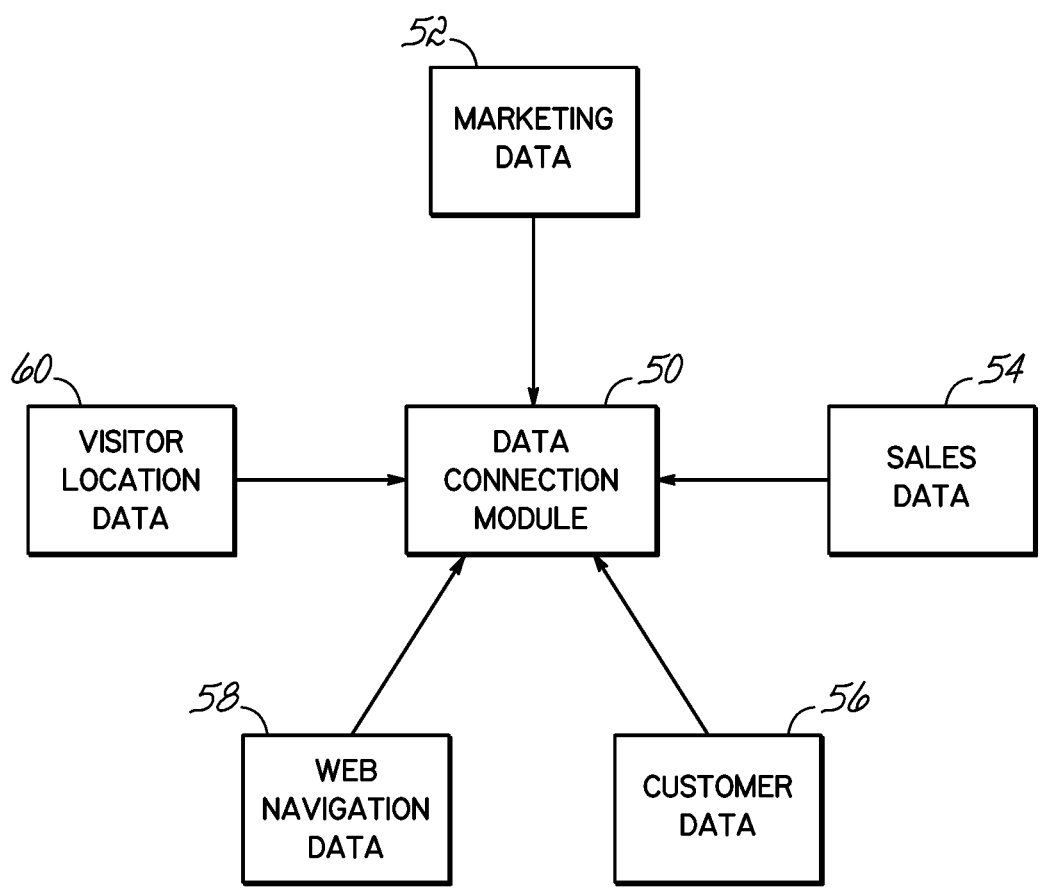
FIG. 3 is schematic view of a data connection module illustrating data flow into the data connection module.

Referring now to FIG. 3, a data connection module 50 is illustrated in accordance with an embodiment of the invention as receiving marketing data 52, sales data 54, customer data 56, web navigation data 58, and customer location data 60. The data connection module 50 may be implemented as one or more applications 44 on the computer 30, and may receive data from the back-office system 12, web server 14, and/or any other suitable source. The data may be collected automatically, such as by the web server 14 during a web session, or entered manually, such as by the sales associate 26 entering data into the back-office system 12 to execute an off-line transaction. Marketing data 52 may include data relating to a marketing campaign, such web marketing that includes paid advertisement purchases, natural search optimization efforts, paid search purchases, and/or e-mail campaigns. Sales data 54 may include quotes and orders, and may be organized by customer, product sold, the time the transaction was made, or any other suitable transaction parameter. Customer data 56 may include data that characterizes or identifies the customer. Examples of customer data include, but are not limited to: e-mail addresses, phone numbers, shipping and/or billing addresses, employer names, employee names, customer names, account numbers, and credit card numbers. Web navigation data 58 may include data relating to customer behavior during a web session, such as products or families of products viewed, web pages visited, paths taken to reach a web page, and time spent viewing a web page or browsing the web-site. Visitor data may include data relating to a virtual or physical address of the web-site visitor, such as an IP address, an e-mail address, and/or a geographic position (e.g., a street address, city, state, or zip code). Data regarding the geographic position of the visitor may be obtained, for example, after the web session based on an IP address obtained during the web session. The data connection module 50 may then use the received data to associate web transaction IDs with off-line transactions.

Figure 4:
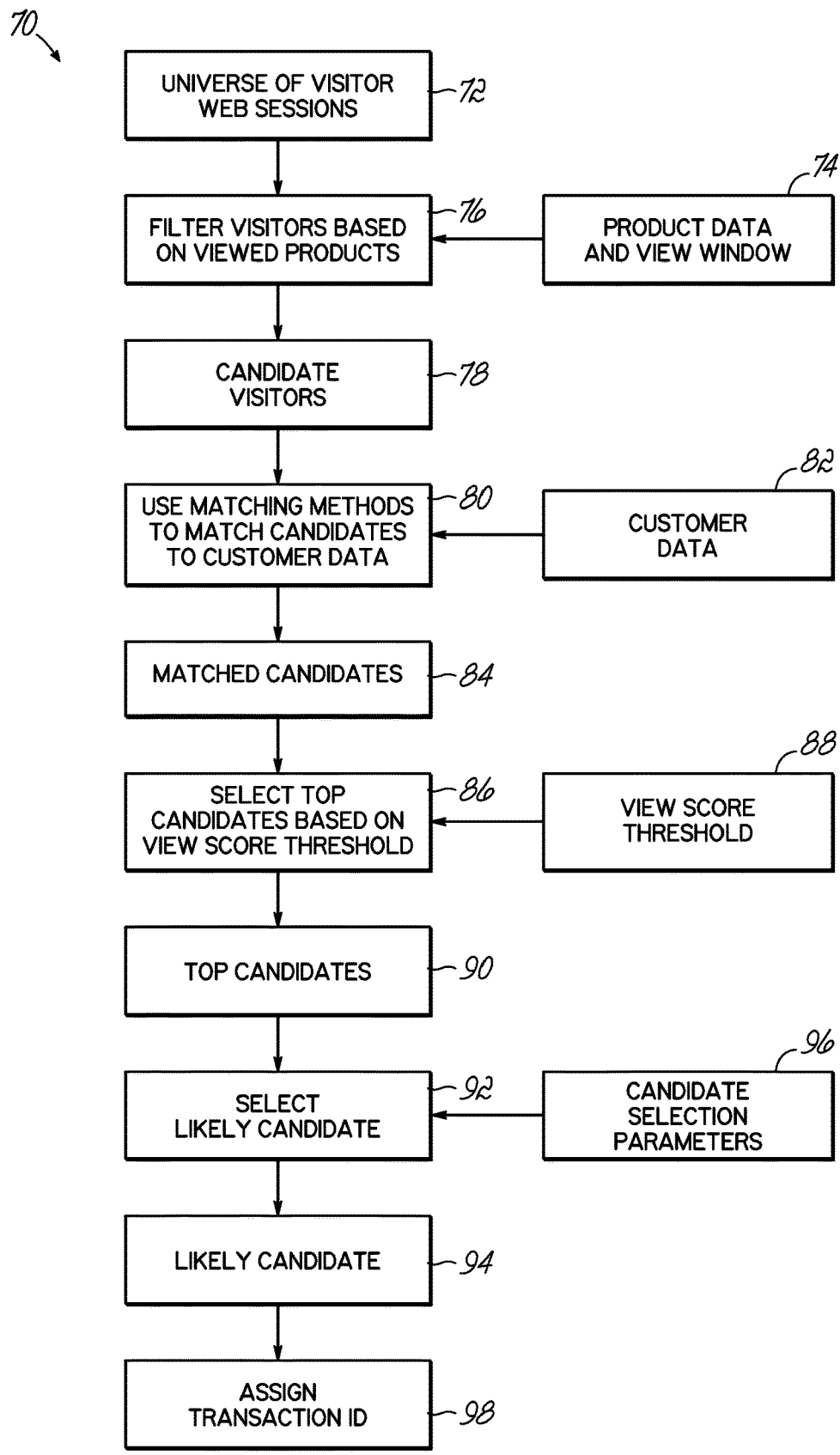
FIG. 4 is a flow chart illustrating a process of associating an off-line transaction with an on-line visitor to a web-site.

Referring now to FIG. 4, a flow chart 70 illustrates a process by which the data connection module 50 may associate a visitor transaction ID to an off-line transaction. To determine if a visitor to the web-site may have been responsible for an off-line transaction, the connection module 50 compares data relating to the visitor's web session to data relating to the off-line transaction. In block 72, a universe of visitors is defined as a set. The universe of visitors may include any visitor that accessed the website over a specific period of time, such as within a predetermined period of time related to the off-line transaction. For example, the predetermined period of time may include a period of time prior to the off-line transaction, a period of time occurring after the off-line transaction, or a period of time beginning prior to the off-line transaction and ending some time after the off-line transaction.

In block 74, products viewed by the visitor during the visitor's web session may be determined for each web session based on the web pages displayed during the web session. In block 76, these products are compared to the products associated with the off-line transaction being analyzed. Web-site visitors that viewed products that correspond to the products associated with the off-line transaction may be identified as candidate visitors 78. These candidate visitors 78 may form a subset within the set of all visitors to the web-site over the analysis period, and may be further analyzed to determine if a corresponding visitor transaction ID should be associated with the off-line transaction being analyzed.

In block 80, the connection module 50 attempts to match candidate visitors 78 to off-line transaction customer data 82 using matching methods. One type of matching may be based on customer e-mail addresses. Each off-line transaction may be associated with one or more e-mail addresses. For example, a closed order may list e-mail addresses for the person placing the order and/or a contact within a company responsible for accepting delivery of the ordered product. In an embodiment of the invention, the customer data 82 may include a list of e-mail addresses associated with the off-line transaction, as well as a geographic address, such as a delivery or billing address. The data connection module 50 may extract one or more of these e-mail addresses and/or geographic addresses from the customer data 82 received from the back-office system 12 for use in matching the web-site visitor to the off-line transaction.

Visitors to the web-site may be asked to create an account or sign into an existing account using an e-mail address. In cases where the visitor provides an e-mail address, matching methods may include comparing one or more e-mail addresses associated with the off-line transaction to the provided e-mail address. If an exact match is found, the corresponding web session may be matched to the off-line transaction on this basis. If there is not an exact match, the matching process may continue by trying to match the domain of the visitor e-mail address to a domain of the off-line customer e-mail addresses. A matching domain may, for example, indicate that one of the persons associated with the off-line transaction is employed by the same entity as the website visitor. This could occur if one person within a company shops the web-site to identify a desired product, then tasks another person with placing an off-line order for the product. Matching e-mail addresses in this way could also be used to match a web session used by one visitor to shop for a product to a subsequent on-line order placed by another visitor at the request of the first visitor.

By way of example, a web session by a visitor signing in with an e-mail address of smith@domainxyz.com may be matched to an off-line transaction listing an e-mail address of jones@domainxyz.com. In an embodiment of the invention, domains may be weighted so that commonly used domains would be considered as not providing a match, while less common domains would result in the web session being matched to the off-line transaction. Examples of domains that an operator may wish to exclude include hotmail.com, msn.com, aol.com, yahoo.com, gmail.com, adelphia.net, verizon.net, comcast.net, cox.net, sbcglobal.net, charterinternet.com. cableone.net, and rr.com, to name but a few. The data connection module 50 may also provide a way for users to customize the excluded domain list to reflect domains commonly encountered by their system, such as an e-mail domain that is used by the web merchant.

Web-site visitors may also be matched to the on-line transaction based on similarities between IP addresses. For example, if the visitor was not matched to the off-line transaction by e-mail address, or if the visitor did not provide an e-mail address (e.g., the visitor did not log into the web-site and browsed the site as a guest), the off-line customer e-mail address may be matched to the visitor based on IP addresses. E-mails from a particular e-mail address are normally received from an e-mail server having a particular IP address or range of addresses. These IP addresses may be obtained, for example, by performing a Domain Name Server (DNS) lookup of an e-mail domain obtained from the customer during the off-line transaction. A customer e-mail address that is associated with an IP address that exactly matches an IP address of data packets received during a visitor web session may cause the data connection module 50 to associate the web session with the off-line transaction. If an exact IP address match does not exist between the visitor web session and customer e-mail address, a match may be based on a partial IP address match. For example, if the three highest order octets or the two highest order octets of the IP addresses match, the visitor web session may be matched to the off-line transaction based on this partial match.

Additional matching methods may be based on geographic proximity. IP addresses are managed by the Internet Assigned Numbers Authority (IANA), which delegates five regional Internet registries to allocate IP address blocks to local Internet service providers. Because IP addresses are assigned in blocks, certain blocks of IP addresses may be associated with users in geographic locations corresponding to the underlying Internet service provider. A geographic location may also be determined by performing a DNS server lookup. If the DNS resource record includes geographic location information, the DNS server lookup may return information regarding the host's geographic location. The DNS server lookup may return a full match (e.g., state and 5 digit zip-code) or a partial match (e.g., state and a partial zip code, or no state and a partial zip code). Thus, the geographic location of a visitor may be determined to varying degrees based on the IP address of the data packets being received by the web server 14. If available, the state and zip-code associated with the IP address may then be compared to the state and zip code of an address associated with the off-line transaction. Web sessions having associated geographic locations within a predetermined distance from the customer location, or zip codes and states that fully or partially match those of an off-line transaction address may be matched to the off-line transaction based on proximity.

Web sessions that are matched to the off-line transaction through one or more matching methods may be included in a set of matched candidates 84. In block 86, the set of matched candidates 84 may be further filtered by assigning a view score to each matched candidate, and comparing the view score to a view score threshold 88. The view score may provide an indication of how well the web session correlates to the products comprising the off-line transaction by comparing products, product families, product sub-category, and/or supplier pages viewed during the web session to products in the off-line transaction. For example, if a matched candidate viewed a product during the web session that is the same as a product included in the off-line transaction, the view score of the matched candidate may be incremented by an amount indicative of an exact product match. Similarly, if the matched candidate viewed a product during the web session from the same family as a product of the off-line transaction, (e.g., the matched candidate viewed a different sized table from the same product line as a table in the off-line transaction), the view score may be incremented by a value indicative of a family match. In an embodiment of the invention, the view score may be incremented by one number of points (e.g., two points) for each exact product match, and by a different number of points (e.g., one point) for each family match.

Other relationships between viewed pages and products included in the off-line transaction may also provide indications that the web session may be related to the off-line transaction. For example, views of product supplier pages and/or product sub-category pages that correspond to products in the off-line transaction may also be used to adjust the view score. Adjustments to the view score are thus not limited to adjustments based on exact product matches or product family relationships between a viewed web page and a product in the off-line transaction. For example, the view score may be adjusted based on other types of relationships. These relationships may include, but are not limited to, product sub-category and/or product supplier relationships between viewed web pages and products in the off-line transaction.

To prevent multiple views of a product or family page for a single product from inflating the view score, the view score may be incremented in response to just the first view of a product or family page. That is, subsequent views of the same product or family page during the web session may be ignored. In addition, if the web-site visitor views both a product page and a product family page of the product included in the off-line transaction, the view score increment may be limited to the points resulting from the product page view. The product page view may thereby displace the family page view so that the view score does not accumulate points for both the product family page view and the product page view of the same product. Hence, the maximum view score for a web session in the above exemplary embodiment in which a product page view generates two view score points would be two points times the number of unique SKUs included in the off-line transaction.

At times, an off-line transaction may include one or more products that have not been assigned a Stock Keeping Unit (SKU). That is, some products sold as part of an off-line transaction may not have an assigned SKU in either the web-site or the back office system. To account for these transactions, products that have not been assigned an SKU may be entered into off-line transactions using "special" SKUs. However, because the special SKU may not be recognized in either the web-site or back office system, the above described method for identifying candidates may fail to include these products in the view score calculation. To address this issue, in an embodiment of the invention, the special SKU may be assigned to a product subcategory and/or supplier associated with the sold product. Based on this association between the special SKU and the subcategory and/or supplier, the data connection module 50 may be configured to identify web-site visitors who are responsible for off-line transactions that include special SKUs.

To this end, the web-site may be configured to record which supplier and subcategory pages are viewed during a web session, as well as the identity of any suppliers and/or subcategories of products and product families that are viewed during the web session. The data connection module 50 may then use this supplier and subcategory view information to adjust the view score, thereby associating a web visitor to an off-line transaction including a product that has not been assigned an SKU. View data may also be recorded for product accessories placed in a shopping cart and this data compared to products and/or accessories included in the off-line transaction. In any case, matched candidates having a view score above the view score threshold 88 may be added to a top candidate list to generate a set of top candidates 90.

In block 92, a likely candidate 94 is selected from the set of top candidates 90 based on one or more candidate selection parameters 96. In an embodiment of the invention, the one or more candidate selection parameters 96 may include the view score, the matching method by which the top candidate was matched to the off-line transaction, and the time at which the web session occurred with respect to the off-line transaction.

The view score threshold 88 may be set to a predetermined value or fixed value. In an alternative embodiment of the invention, the view score threshold 88 may be set to a predetermine percentage of the maximum possible view score for the off-line transaction being analyzed. In this embodiment, candidates having a view score below the predetermined percentage of the maximum view score may be eliminated from further consideration in the selection process. For example, if the view score threshold 88 is set at 50% of the maximum view score for the off-line transaction, and the maximum possible view score for a particular off-line transaction is eight, candidates having a view score of less than four may be eliminated as possible candidates for that off-line transaction.

In yet another alternative embodiment of the invention, the view score threshold 88 may set based on a graduated scale of percentage values that would be applied based on a confidence level associated with the matching method that matched the candidate to the off-line transaction. Thus, the view score threshold may be adjusted to take into account that some matching methods may provide a greater level of confidence that a correct match has been made than other matching methods. For example, a candidate matched to an off-line transaction by an exact e-mail address may be considered to be matched with a higher level of confidence that a candidate matched by a proximity match relying on a 1-digit ZIP code and state match.

In an embodiment of the invention, the likely candidate selection begins by ranking the set of top candidates 90 based on their view scores from highest to lowest. If more than one top candidate has the same view score (or is in a group of visitors having view scores high enough so that the visitors are all considered equally likely to be responsible for the off-line transaction), the likely candidate 94 may be selected based on how the candidate was matched to the off-line transaction. For example, matching methods may be assigned a match strength based on a confidence level associated with the type of matching method. Match strength may also be assigned based on whether the likely candidate is a customer (e.g., the candidate logged into the web-site using a customer account) or a guest (e.g., the candidate visited the web-site without logging into a customer account).

An exemplary match strength ranking from highest to lowest may be:
(1) customer matched by exact e-mail address; (2) customer matched by e-mail domain; (3) customer matched by exact IP address; (4) guest matched by exact IP address; (5) customer matched by the three highest order octets of the IP address; (6) guest matched by the three highest order octets of the IP address; (7) customer matched by the two highest order octets of the IP address; (8) guest matched by the two highest order octets of the IP address; (9) customer matched with a geographic proximity match of 5 ZIP code digits plus state; (10) guest matched with a geographic proximity match of 5 ZIP code digits plus state; (11) customer matched with a geographic proximity match of 4 ZIP code digits plus state; (12) guest matched with a geographic proximity match of 4 ZIP code digits plus state; (13) customer matched with a geographic proximity match of 3 ZIP code digits plus state; (14) guest matched with a geographic proximity match of 3 ZIP code digits plus state; (15) customer matched with a geographic proximity match of 2 ZIP code digits plus state; (16) guest matched with a geographic proximity match of 2 ZIP code digits plus state; (17) customer matched with a geographic proximity match of 1 ZIP code digit plus state; (18) guest matched with a geographic proximity match of 1 ZIP code digit plus state; (19) customer matched with a geographic proximity match of 2 ZIP code digits and no state match; and (20) guest matched with a geographic proximity match of 2 ZIP code digits and no state match.

In an alternative embodiment of the invention, a candidate who has a view score that is significantly higher than that of other candidates may be considered based on the view score alone. That is, a candidate that is not matched to the off-line transaction by any of the aforementioned matching methods may nevertheless be determined to be a likely candidate based on a high view score. For example, a candidate having a view score that is within two of the maximum view score, and that exceeds the next highest candidate's view score by four or more, may be considered to be a likely candidate despite failing to be matched to the off-line transaction by any of the aforementioned matching criteria (email address, email domain, IP address, or geographic proximity). The candidate with the highest view score may also be selected as the likely candidate if all other matching criteria for the other candidates are equal. This likely candidate selection logic may be applied even if the candidate is not matched to the off-line transaction by any of the other aforementioned matching criteria. This maximum view score logic may also be applied to candidates matched by one of the aforementioned matching methods 1-20 to increase the level of confidence in the match.

Persons having ordinary skill in the art will understand that the matching methods related to IP addresses discussed herein may be based on IPv4 format IP addresses, and that these matching methods may be updated as necessary to accommodate newer evolutions of IP address formatting, such as IPv6. Similarly, matches based on zip codes may be based on the United States Postal Service postal code system. However, it is contemplated that similar logic may be applied to accommodate international postal code systems for transactions involving international customers In an alternative embodiment of the invention, the top candidate having a particularly strong match strength may be selected as the likely candidate even though they may have a view score that is less than that of another candidate. Thus, the candidate with the highest view score, the highest match strength, or a combination of the highest view score and highest match strength may be identified as the likely candidate and associated with the off-line transaction.

Embodiments of the invention may also use match strength to determine a weight given to the off-line transaction in the analytics system 18. For example, in the case where an off-line transaction is matched to the likely candidate by a highly reliable match method, such as an exact e-mail address match, the analytics system 18 may treat the off-line transaction with the same or a similar weight as an on-line transaction. In contrast, in the case where the off-line transaction is matched to the likely candidate based on a less reliable match method, such as a proximity match having a single matching zip code digit and a matching state, the analytics system may give the off-line transaction a lower weight than an on-line transaction. In this alternative embodiment, each off-line transaction may be given a confidence rating based on the corresponding match strength of the likely candidate, and this confidence rating provided to the analytics system 18 with the off-line transaction data and visitor transaction ID.

Embodiments of the invention may also select the likely candidate based on a proximity in time between the web session and the off-line transaction. That is, the web session that occurred closest in time prior to the off-line transaction may be selected as the likely candidate from multiple top candidates having the same or similar view scores and matching methods. Time proximity may also be used to select a visitor transaction ID from multiple IDs in the event the same visitor has participated in multiple web sessions over the predetermined period of time prior to the off-line transaction. In an alternative embodiment, when it is determined that a single visitor generated multiple web-sessions relating to the off-line transaction, the first web-session may be associated with the off-line transaction based on the premise that this web session may provide the best information on how the visitor found the web-site.

In any case, in response to selecting the likely candidate 94, the data connection module 50 may proceed to block 98 and associate the off-line transaction with the likely visitor transaction ID. The off-line transaction and associated visitor transaction ID may then be uploaded to the analytics system 18 in a similar manner as on-line transactions. The off-line transaction may thereby be taken into account by the analytics system 18 in determining web marketing effectiveness, and to help web designers improve the web-site design.

Figure 5:
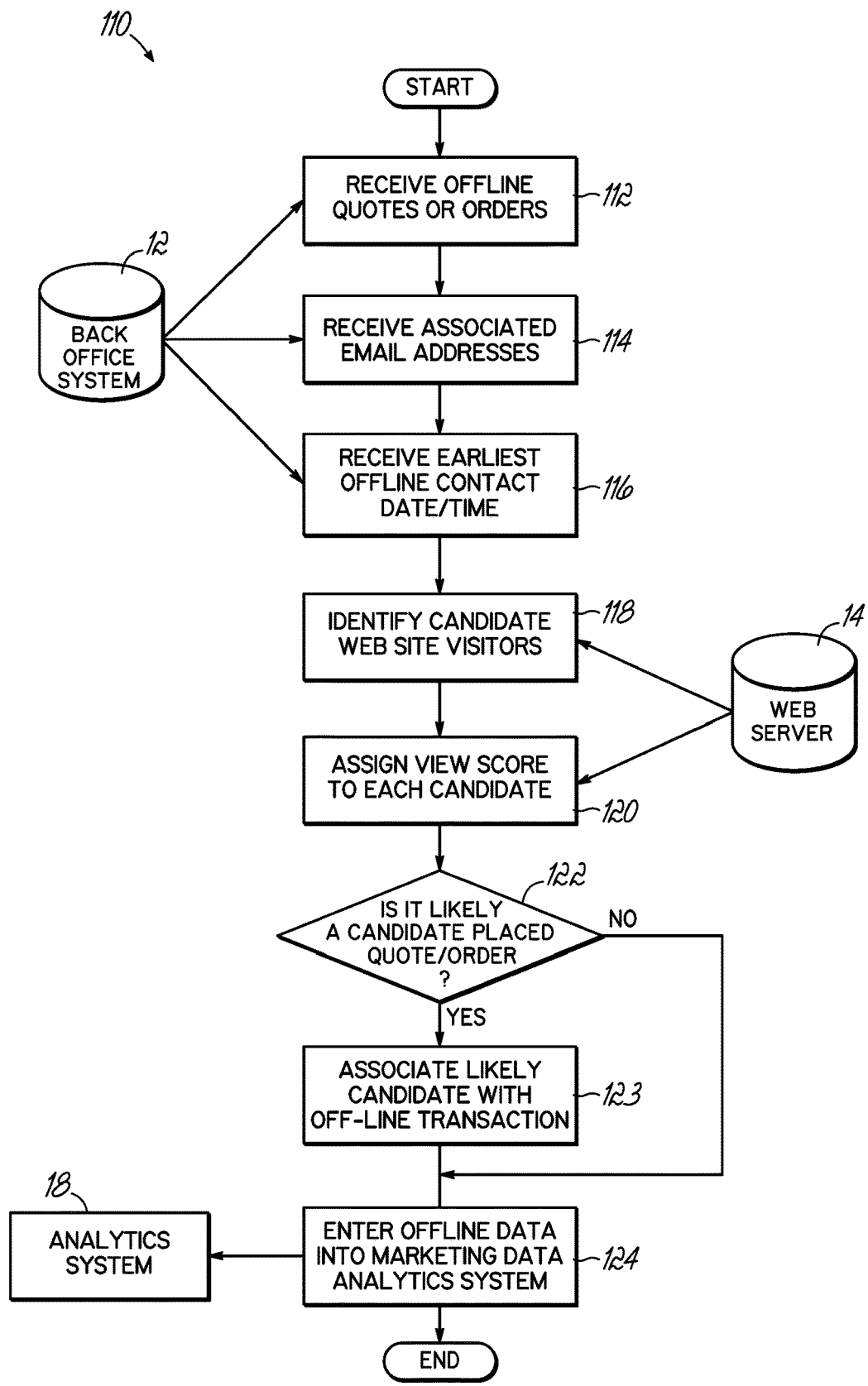
FIG. 5 is a flow chart illustrating a portion of the process of FIG. 4 in additional detail.

Referring now to FIG. 5, a flow chart 110 illustrates a process of associating visitor transaction IDs with off-line transactions, and sending the associated transitions to the analytics system 18 in accordance with an embodiment of the invention. In block 112, the data connection module 50 receives off-line transactions from the back-office system 12 in the form of quotes and/or orders. This may occur as quotes and orders are entered in to the back-office system 12, or may be scheduled as a batch process that is conducted at regular intervals, such as at the end of the business day. The data connection module 50 may receive the off-line data in response to a query to the back-office system 12. The back-office system 12 may also be configured to push out this data to the data connection module 50 as it is received, or as a scheduled batch process. In an embodiment of the invention, off-line transactions for the previous day may be pulled off the back-office system 12 each night. The back-office system 12 may reside on the same computer 30 as the data connection module 50, in which case communication between the back-office system 12 and the data connection module 50 would be internal to the computer 30. The back-office system 12 and data connection module 50 may also reside on separate computers 30, in which case communication between the back-office system 12 and data connection module 50 may be via the network 20.

In block 114, the data connection module 50 may retrieve e-mail addresses associated with the off-line quotes and orders from the back-office system 12. These e-mail addresses may include addresses that are obtained from the customer during the off-line transaction, or in the case of a returning customer, the e-mail addresses may be on file from previous transactions. The received e-mail data may also include IP addresses associated with the e-mail address, such as the IP address of the e-mail server associated with the e-mail address. The IP address of the e-mail server may be determined based on a DNS lookup of the e-mail domain name, as described above. In block 116, the data connection module 50 may receive data relating to the time and date of the earliest off-line customer contact relating to each off-line transaction, which may be used to establish a period of time that defines the universe of visitor web sessions.

In block 118, the data connection module 50 identifies candidate web-site visitors. This process may include receiving web session data from the web server 14, and defining a universe of visitor web sessions for each off-line transaction received from the back-office system 12. For example, the universe of visitor web sessions may include all web sessions that occurred during a predetermine period of time prior to, straddling, or after the earliest contact date for the off-line transaction. Exemplary predetermined periods of time may include one or more days, weeks, months, or combinations thereof, and embodiments of the invention are not limited to any particular predetermined period. Candidate web-site visitors may then be identified from the universe of visitor web sessions based on viewed products as described above with respect to FIG. 4.

In block 120, the data connection module 50 may assign a view score to the identified candidates. The candidates may be filtered based on this view score by, for example, eliminating any candidates with a view score below a threshold value. This threshold may be a fixed value, or may be adjusted based on how the candidates were matched to the off-line transaction as described in more detail above. In response to assigning a view score to the candidates, the data connection module may proceed to decision block 122.

In decision block 122, the data connection module 50 determines if one of the candidates is a likely candidate. That is, based on the view scores and/or matching parameters, the data connection module 50 determines if any of the candidate visitor web sessions are likely to be related to the off-line transaction being analyzed. If a likely candidate is identified ("Yes" branch of decision block 122), the data connection module 50 proceeds to block 123 and the off-line transaction is associated with the likely candidate's web session visitor transaction ID. If a likely candidate is not identified ("No" branch of decision block 122), the data connection module 50 may proceed to block 124 without associating the off-line transaction with a web visitor. In either case, in block 124 the off-line transaction may be entered into the analytics system 18. If the off-line transaction has been associated with the likely candidate, the off-line transaction may be included in the web marketing effectiveness analysis. If the off-line transaction has not been associated with a likely candidate, the off-line transaction data may simply be ignored, or may be analyzed by the analytics system 18 without being associated with a specific on-line activity or visitor session. This process may be repeated for each off-line transaction received from the back-office system 12. The analytics system 18 may then analyze the effect of web-based marketing on both on-line and off-line transactions, thereby providing improved information regarding Return On Ad-Spend (ROAS) as compared to systems that rely solely on on-line transaction data.

Figure 6:
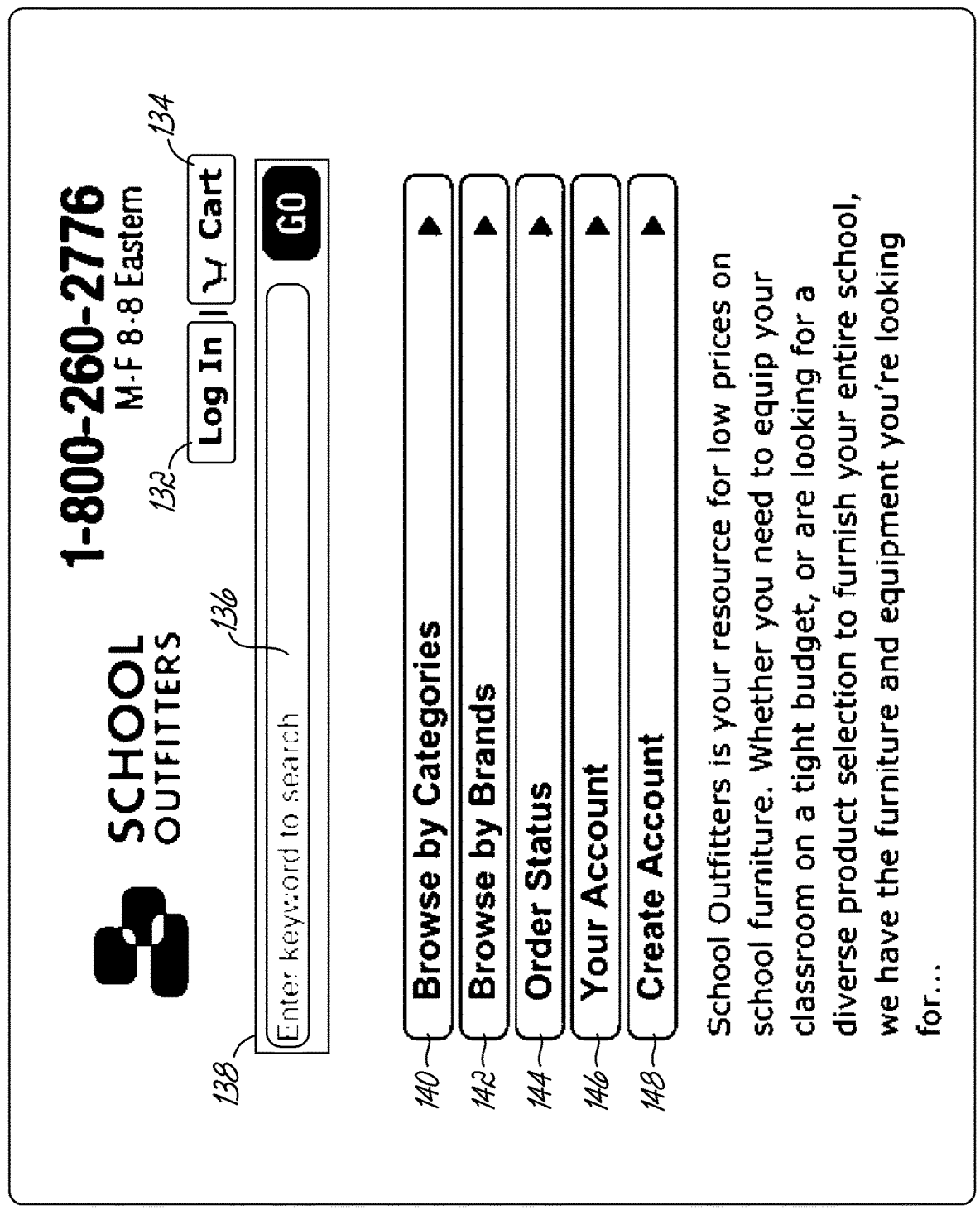
FIG. 6 is a diagrammatic view of a screen shot for a home page of a web-site in accordance with an embodiment of the invention.

Referring now to FIG. 6, in operation, a visitor to an exemplary merchant web-site may enter the web-site through a home page 130. The home page may include a log-in button 132, a shopping cart button 134, a keyword search field 136 and search button 138, and menu selection buttons that allow the visitor to browse products by categories 140, browse products by brand 142, check on order status 144, check on a customer account 146, and create an account 148. Visitors may log-into an existing customer account by activating the log-in button 132 and entering an e-mail address. Visitors not having an account may create a customer account by activating the create account selection button 148 and entering an e-mail address. Returning customers may also be identified based on a data stored on the user system 16, such as in the form of an HTTP cookie. Visitors may also browse the web-site as a guest without logging in, creating an account, or otherwise being required to supply an e-mail address.

Figure 7A:
FIG. 7A is a view of a product sub-category page of the web-site in FIG. 6.
Figure 7C:
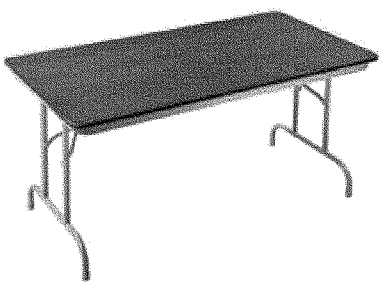
FIG. 7C is a view of a product page displayed in response to selecting a link on the product family page of FIG. 7B.

Referring now to FIGS. 7A-7C, a visitor activating a button may be taken to another web page or provided with a new or updated window. For example, a visitor activating the browse by category button 140 and selecting "Tables/Folding Tables" from a drop down menu may be presented with a product sub-category page 150 that displays a plurality of windows 152-154 each presenting information regarding a family of products sold by the merchant, e.g., a family of folding tables. If the visitor selects the window 152 (e.g. by clicking on the window 152), a product family page 155 may be displayed to the visitor. The product family page 155 may include a plurality of links 156a-156e, with each link being associated with a product in the product family. If the visitor is interested in a particular product, the visitor may select one of the product links 156a-156e (e.g., 156a), which may cause a product window 157 for the selected product to be displayed to the visitor.

Subsequent analysis of this exemplary web session in relation to an off-line transaction including the table shown on product page 157 may increment the view score of this web session by a number of points (e.g., two points) based on the visitor viewing the "High-Pressure Top Folding Table (30" W×60" L)" product page 157. If, on the other hand, the visitor ends the web session after viewing the product family page 155, but without viewing the product page 157, the view score for the aforementioned off-line transaction may be incremented by a different number of points (e.g., one point) based on the visitor viewing the product family page 155. As described above, in some cases an off-line transaction may include a product that has not been assigned an SKU, but that is classified as belonging to a particular product subcategory. For example, if the off-line transaction included in a folding table that was not listed on the web-site, the view-score may be incremented by a predetermined amount based on the visitor viewing the product sub-category page 150. In an alternative embodiment of the invention, the view score may also be incremented by yet another predetermined amount based on the visitor viewing a supplier page for a product included in the off-line transaction (e.g., products manufactured by Norwood Commercial Furniture). A person having ordinary skill in the art would thus understand that embodiments of the invention are not limited to a particular number of points being assigned to the view score based on the visitor viewing a web page having a particular relationship to a product in the off-line order.

Figure 8:
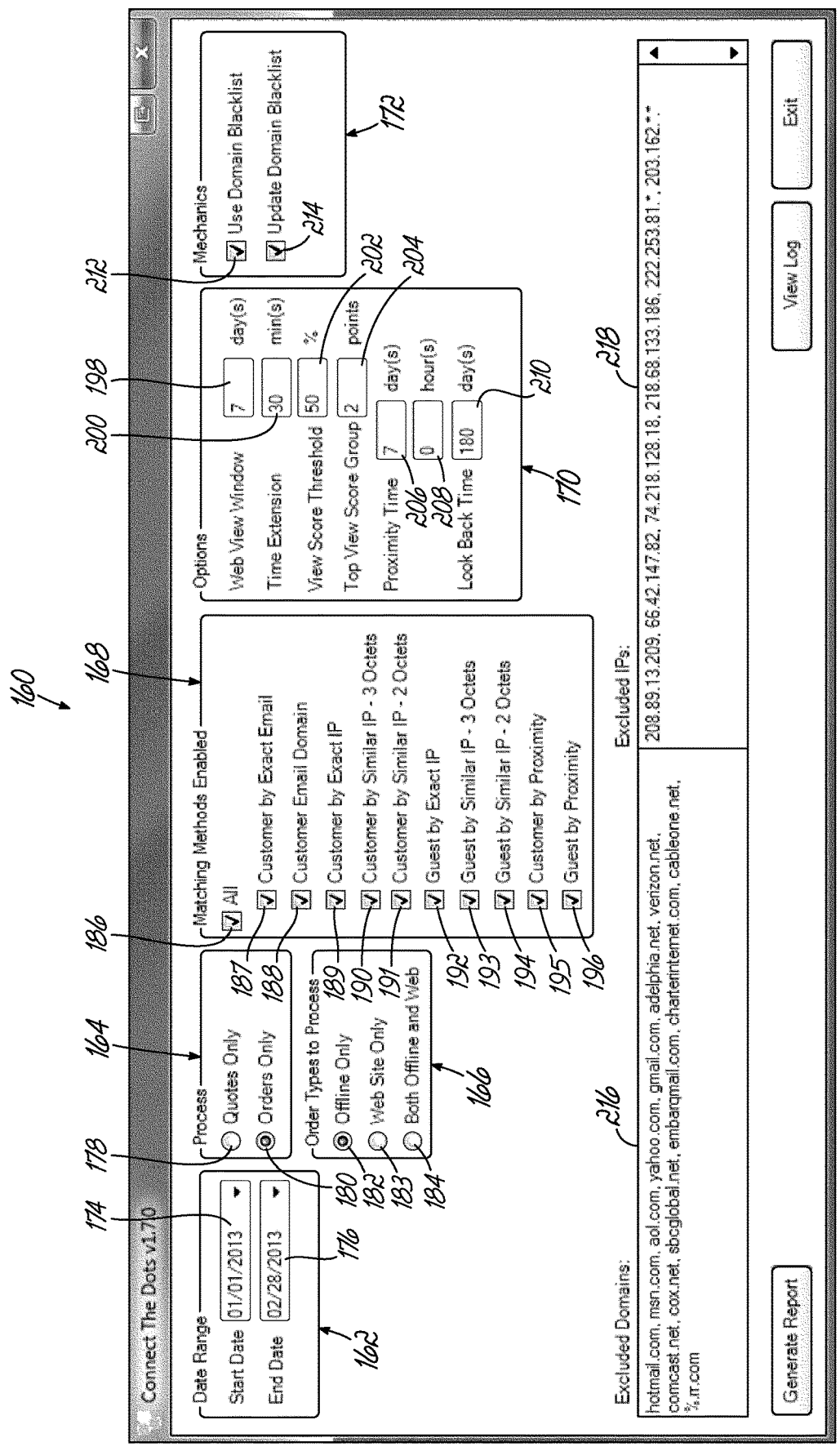
FIG. 8 is a diagrammatic view of a control panel for the data connection module of FIG. 3.

Referring now to FIG. 8, the data connection module may present an exemplary control panel window 160 to a system user via the user interface 40 of computer 30. The control panel window 160 may allow the system user to adjust or customize the operating parameters of the connection module 50. To this end, the control panel window 160 may include a date range entry window 162, a process selection window 164, a process type selection window 166, a matching methods selection window 168, a universe of visitors filter selection window 170, and a mechanics window 172.

The date range entry window 162 may include a start date entry field 174 and an end date entry field 176 that enables the user to select the dates for which transactions will be analyzed. The user may also select whether quotes, orders, or both quotes and orders will be analyzed by selectively activating a corresponding quotes button 178 and/or a corresponding orders button 180 in the process selection window 164. The user may further cause the system to analyze off-line transactions, on-line transactions, or both off-line and on-line transactions by activating a corresponding button 182-184 in the process type selection window 166.

The user may select which matching methods the data connection module 50 uses to select a likely candidate from the set of visitor candidates by activating one or more matching method selection buttons 186-196. By selectively activating the buttons 186-196, the user may control which of the matching methods described above with respect to FIG. 4 are used to identify the likely candidate. To control how the universe of visitors is defined, the user may enter data into window 170. This data may include a web view window entry field 198 that enables the user to define the number of days prior to the transaction date from which web sessions will be selected. The universe of visitors filter selection window 170 may also include, for example, data entry fields for defining a time extension 200, a view score threshold 202, a top view score group 204, proximity time in days 206 and hours 208, and a look back time 210. The mechanics window 172 may provide the user with buttons 212, 214 that enable activation and/or editing of domain and/or IP address blacklists, 216, 218, which are shown with exemplary domains and IP addresses. Once the control parameters have been selected, the data connection module 50 may be run automatically by a scheduled service. In an alternative embodiment of the invention, the functionality for controlling the various operational aspects of the connection module may be implemented within the back-office system 12, rather than via the user interface of the data connection module 50 shown in FIG. 8. Persons having ordinary skill in the art will therefore understand that embodiments of the invention are not limited to the user interface depicted in FIG. 8.

Referring now to FIGS. 9-12, result sheets 220-223 illustrate exemplary candidate lists that may be generated by an embodiment of the data connection module 50 for off-line quotes, with each candidate list including a likely candidate. Each sheet 220-223 may include a quote number column 228-231, a quote transaction ID column 236-239, a max score column 244-247, a visitor type column 252-255, a visitor ID column 260-263, a visitor match indicator column 268-271, a view score column 276-279, a visitor transaction ID column 284-287, a candidate match method column 292-295, a zip code match column 300-303, and a state match column 308-311.

Result sheet 220 depicts exemplary results that include a web-site visitor that has been matched to an off-line quote based on proximity. As is apparent from the information presented in the visitor type column 252, view score column 276, and candidate match column 292, each of the candidate web sessions was generated by a guest visitor, has a view score of 2, and was matched by proximity. However, one of the candidate proximity matches includes a five digit zip code and state that match corresponding fields in the shipping address of the off-line quote. Because no other top candidates have a proximity match having the same match strength, the web session with visitor transaction ID 1130118B442065 is identified as the likely candidate in the visitor match indicator column 268. The identified visitor transaction ID may therefore be associated with the quote number in column 228, and the quote uploaded to the analytics system 18.

Results sheet 221 depicts exemplary results that include a web-site visitor that is matched to an off-line quote based on an e-mail address. In this exemplary embodiment, two top candidates have maximum view scores of eight. The maximum view score may be eight because—for example—the off-line transaction included four unique product SKUs. The maximum score may then be calculated by multiplying the number of unique SKUs times two points per SKU if the visitor viewed a product page for each SKU. The view scores for the candidates in this example would therefore be limited to eight because each candidate is given a maximum of two points for viewing each of the products that is included in the off-line transaction. However, in an alternative embodiment of the invention, the maximum view score may be set independently of the number of products in the off-line transaction. Moreover, persons having ordinary skill in the art will understand that the scores assigned to each type of product related web page view may have any value. Embodiments of the invention are therefore not limited to any particular maximum view score, or incrementing the view score by any particular number of points for a particular type of page view. In any case and returning to the above example, visitor 154896 logged in as a customer for the web session, and the log in e-mail matches an e-mail associated with the off-line quote. In contrast, visitor 7844620 did not log in or create an account, and was matched by proximity. Because the match strength of visitor 154896 is greater than the match strength of visitor 7844620, visitor 154896 is selected as the likely match to the off-line quote.

Results sheet 222 depicts exemplary results that include a web-site visitor that has been matched to an off-line quote based on a similar IP address. In the depicted example sheet, each top candidate is listed is a guest visitor. However, the visitor selected as the likely visitor has both the highest view score and is matched by an IP address sharing the three highest order octets with the off-line quote data. That is, the IP address associated with the visitor's web session matches the three highest order octets of an IP address associated with a customer e-mail address that is listed in the off-line quote. Thus, visitor 21719218 has a higher match strength than the other candidates, which are matched by a proximity match in which just the first digit of the zip code associated with the web session IP address matches the shipping address. Visitor 21719218 may therefore be selected as the likely candidate because the level of confidence produced by the partial IP address match is higher than the level of confidence produced by the single digit zip code proximity matches. That is, the match strength of a three octet IP address match is defined in the data connection module 50 as being higher than the match strength of a single digit zip code proximity match. In this example, the likely visitor is associated with visitor transaction IDs 1130116A832648 and 1130117A076343. That is, the same visitor generated two web sessions during the period of time defined in the web view window entry field 198 of the universe of visitors filter selection window 170. In cases where the likely candidate has generated multiple web sessions, the data connection module may select web session that occurred earliest in time. This may be because the web session occurring earliest in time provides the best indication of when and how the candidate first accessed the web-site in relation to the off-line transaction being analyzed. In cases where multiple different candidates are matched identically by the match criteria, the data connection module 50 may select the candidate that viewed the product or product family closest in time to the first contact time of the quote or order.

Results sheet 223 depicts exemplary results that include a web-site visitor matched to an off-line quote based on a proximity match having a relatively low confidence level. Four of the six top candidates are matched by proximity method having the same confidence level, e.g., matching one zip code digit and the state. In this scenario, the data connection module 50 may select the visitor that viewed the web page having the matching product or product family closest in time to the time of first contact for the off-line quote. Because visitor 21724297 generated the product page view that occurred closest in time to the first contact time of the quote, that visitor may be identified as the likely candidate and the corresponding visitor transaction ID associated with the off-line quote.

As will be appreciated by one skilled in the art, the embodiments of the invention may also be embodied in a computer program product embodied in at least one non-transitory computer readable storage medium having computer readable program code embodied thereon. The non-transitory computer readable storage medium may be an electronic, magnetic, optical, electromagnetic, infrared, or semiconductor system, apparatus, or device, or any suitable combination thereof, that can contain or store a program for use by or in connection with an instruction execution system, apparatus, or device. Exemplary non-transitory computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. An apparatus for associating a transaction involving a product with a visitor to a web-site, the apparatus comprising:
    a processor;
    storage; and
    a memory including program code defining a data connection module and implementing a sales database and web navigation database in said storage, wherein the program code when executed by the processor, causes the processor to:
    receive first data at the processor and store the first data in the sales database, the first data relating to the transaction;
    receive second data at the processor and store the second data in the web navigation database, the second data relating to a plurality of web sessions, each web session being generated by a visitor to the web-site;
    within the data connection module access the first data from the sales database and second data from the web navigation database and, for each visitor, determine if any products in the transaction relate to a page viewed by the visitor during the visitor's web session based on the first and second data;
    within the data connection module, generate a visitor score based on a number of products in the transaction that were determined to relate to a viewed web page; and
    within the data connection module, associate one or more of the visitors with the transaction based on the visitor score.

2. The apparatus of claim 1, wherein the program code, when executed by the processor, causes the processor to perform steps further comprising:
    defining a first plurality of visitors that have viewed at least one web page associated with at least one of the one or more products;
    determining a first parameter based on the first data;
    determining a second parameter based on the second data; and
    defining a second plurality of visitors from the first plurality of visitors based on the first parameter matching the second parameter.

3. The apparatus of claim 2 wherein the first parameter is a first e-mail address, and the second parameter is a second e-mail address, an e-mail domain, an Internet Protocol address, or a part of an Internet Protocol address.

4. The apparatus of claim 2 wherein the first parameter is a first Internet Protocol address, and the second parameter is a second Internet Protocol address, or a part of the second Internet Protocol address.

5. The apparatus of claim 4 wherein determining the first parameter based on the first data includes determining the first e-mail address from the first data, and determining the first Internet Protocol address based on the first e-mail address.

6. The apparatus of claim 5 wherein determining the first Internet Protocol address from the first e-mail address includes performing a domain name server query.

7. The apparatus of claim 2 wherein the first parameter is a street address including a first state and a first zip code, and the second parameter is a second state, a second zip code, or a part of a zip code.

8. The apparatus of claim 7 wherein the second parameter is determined based on an Internet Protocol address.

9. The apparatus of claim 2, wherein the program code, when executed by the processor, causes the processor to perform steps further comprising:
    determining a time of first contact for the transaction;
    for each visitor of the second plurality of visitors, determining a difference in time between the time the visitor viewed a page relating to the product and the time of first contact; and
    selecting the one or more visitors from the second plurality of visitors based on the difference in time.

10. The apparatus of claim 9 wherein selecting the one or more visitors from the second plurality of visitors based on the difference in time includes selecting the one or more visitors having the least difference in time.

11. The apparatus of claim 9 further comprising:
    in response to determining that the one or more selected visitors generated two or more web sessions, selecting the web session from the two or more web sessions that occurred earliest in time.

12. The apparatus of claim 2 further comprising:
    determining a confidence level based on a type of match between the first parameter and the second parameter; and
    selecting a visitor from the second plurality of visitors based on the confidence level, wherein the selected visitor is the one or more visitors associated with the transaction.

13. The apparatus of claim 12 further comprising:
    weighing the transaction in an analytics system based on the confidence level.

14. The apparatus of claim 1 wherein the transaction is an off-line transaction.

15. The apparatus of claim 1 wherein the view score is further generated based on a type of relationship between each of the products of the number of products in the transaction that were determined to relate to a viewed web page and the viewed web page.

16. An apparatus for associating a transaction involving one or more products with a visitor to a web-site, the apparatus comprising:
    a processor;
    storage; and
    a memory including program code defining a data connection module, and implementing a sales database, and web navigation database in said storage, wherein the program code when executed by the processor, causes the processor to:
    receive first data at the processor and store the first data into the sales database, the first data relating to the transaction;
    receive second data at the processor and store the second data into the web navigation database, the second data relating to a plurality of web sessions, each web session being generated by a visitor to the web-site;
    within the data connection module, access the web navigation database and sales database, and perform a comparison to define a first plurality of visitors that generated a web session including a view of a web page associated with at least one of the one or more products described by the first data;
    within the data connection module, determine a first parameter based on the first data;
    within the data connection module, determine a second parameter based on the second data;
    within the data connection module, define a second plurality of visitors from the first plurality of visitors based on the first parameter matching the second parameter;

within the data connection module, select a likely candidate from the second plurality of visitors based on a strength of the match between the first and second parameters; and
within the data connection module, associate the likely candidate with the transaction.

17. The apparatus of claim 16 wherein the first parameter is a first e-mail address, and the second parameter is a second e-mail address, an e-mail domain, an Internet Protocol address, or a part of an Internet Protocol address.

18. The apparatus of claim 16 wherein the first parameter is a first Internet Protocol address, and the second parameter is a second Internet Protocol address, or a part of the second Internet Protocol address.

19. The apparatus of claim 16 wherein the first parameter is a street address including a first state and a first zip code, the second parameter is a second state, a second zip code, or a part of a zip code, and the second parameter is determined based on an Internet Protocol address.

20. A computer program product comprising:
a non-transitory computer readable storage media containing program code defining a data connection module and implementing a sales database and web navigation database in said storage, wherein the program code when executed by the processor, causes the computer to:
receive first data at the computer and store the first data in the sales database, the first data relating to the transaction;
receive second data at the computer and store the second data in the web navigation database, the second data relating to a plurality of web sessions, each web session being generated by a visitor to the web-site;
within the data connection module access the first data from the sales database and second data from the web navigation database and, for each visitor, determine if any products in the transaction relate to a page viewed by the visitor during the visitor's web session based on the first and second data;
within the data connection module, generate a visitor score based on a number of products in the transaction that were determined to relate to a viewed web page; and
within the data connection module, associate one or more of the visitors with the transaction based on the visitor score.

21. A computer program product comprising:
a non-transitory computer readable storage media containing program code defining a data connection module and implementing a sales database and web navigation database in said storage, wherein the program code when executed by the processor, causes the processor to:
receive first data at the computer and store the first data into the sales database, the first data relating to the transaction;
receive second data at the computer and store the second data into the web navigation database, the second data relating to a plurality of web sessions, each web session being generated by a visitor to the web-site;
within the data connection module, access the web navigation database and sales database, and perform a comparison to define a first plurality of visitors that generated a web session including a view of a web page associated with at least one of the one or more products described by the first data;
within the data connection module, determine a first parameter based on the first data;
within the data connection module, determine a second parameter based on the second data;
within the data connection module, define a second plurality of visitors from the first plurality of visitors based on the first parameter matching the second parameter;
within the data connection module, select a likely candidate from the second plurality of visitors based on a strength of the match between the first and second parameters; and
within the data connection module, associate the likely candidate with the transaction.

* * * * *